United States Patent [19]
Abidin et al.

[11] Patent Number: 6,058,915
[45] Date of Patent: May 9, 2000

[54] MULTICYLINDER INTERNAL COMBUSTION ENGINE WITH EXTERNALLY SUPPLIED IGNITION

[75] Inventors: Anwar Abidin, Leonberg; Andreas Eichendorf, Schorndorf; Christof Vogel, Bischberg, all of Germany

[73] Assignee: Robert Bosch GmbH, Stuttgart, Germany

[21] Appl. No.: 09/029,087

[22] PCT Filed: Dec. 18, 1996

[86] PCT No.: PCT/DE96/02440

§ 371 Date: Aug. 18, 1998

§ 102(e) Date: Aug. 18, 1998

[87] PCT Pub. No.: WO97/48898

PCT Pub. Date: Dec. 24, 1997

[30] Foreign Application Priority Data

Jun. 19, 1996 [DE] Germany .................... 196 24 368

[51] Int. Cl.[7] .................................................. F02M 31/00
[52] U.S. Cl. .................................... 123/546; 123/549

[58] Field of Search ................................ 123/543, 549, 123/546, 552

[56] References Cited

U.S. PATENT DOCUMENTS

| | | | |
|---|---|---|---|
| 4,375,799 | 3/1983 | Swanson | 123/549 |
| 4,550,706 | 11/1985 | Hoffman | 123/549 |
| 4,593,670 | 6/1986 | Nara et al. | 123/546 |
| 5,873,354 | 2/1999 | Krohn et al. | 123/549 |

*Primary Examiner*—Marguerite McMahon
*Attorney, Agent, or Firm*—Edwin E. Greigg; Ronald E. Greigg

[57] ABSTRACT

This disclosure is directed to a multicylinder internal combustion engine with externally supplied ignition, which has a fuel vaporizing device which is connected to individual intake tubes of the engine via a line system. The line system is embodied as branching in such a way that only respective combustion chambers which are not operated in direct ignition sequence (1-3-4-2) are connected in pairs to each other and jointly via a central line to the fuel vaporizing device. The multicylinder internal combustion engine with externally supplied ignition, is provided for motor vehicles.

9 Claims, 2 Drawing Sheets

MULTICYLINDER INTERNAL COMBUSTION ENGINE WITH EXTERNALLY SUPPLIED IGNITION

PRIOR ART

The invention is based on a multicylinder internal combustion engine with externally supplied ignition. The patent application GB 2 248 087 has already disclosed an internal combustion engine that has an intake tube that transitions into an intake manifold from which individual intake tubes branch to the individual combustion chambers or to the individual cylinders of the engine. By means of fuel injection valves disposed in the individual intake tubes, upstream of inlet valves of the combustion chambers, fuel can be delivered into the individual intake tubes in order to prepare an ignitable fuel-air mixture, which flows into the combustion chambers when the inlet valves are open. An electronic engine control device controls the fuel quantity delivered by the fuel injection valves as a function of the aspirated air mass of the engine and as a function of other engine operation parameters.

In addition to the injection by means of the individual fuel injection valves, the engine has another injection valve that is part of a central fuel vaporizing device which can prepare fuel vapor which is then delivered into the intake tube upstream of a throttle mechanism that is embodied, for example, in the form of a throttle valve. The delivery of fuel vapor by means of the fuel vaporizing device is limited to the lower load range, in particular to the idling range of the engine. In the upper load range, particularly in the full load, though, only the fuel injection valves associated with the combustion chambers or the cylinders deliver the required fuel. The delivery of vaporous fuel into the intake tube is intended to prevent, to the greatest extent possible, a re-condensation of the fuel vapor against cold walls of the engine that would otherwise occur during the starting phase of the engine in order to thus be able to sharply reduce the emission of polluting exhaust components, in particular hydrocarbons.

It is, however, problematic that depending on the ignition sequence of the individual cylinders or their intake sequence, because of a reciprocal influence of the cylinders during intake of the fuel vapor prepared by the fuel vaporizing device, due to intake tube oscillations, this fuel vapor is only distributed unevenly to the individual combustion chambers of the cylinders. However, this results in an increase in the emissions of polluting exhaust components so that it is not possible to maintain extremely low exhaust values as well as a smooth running of the engine.

ADVANTAGES OF THE INVENTION

The engine according to the invention has the advantage over the prior art that a virtually uniform distribution of the fuel vapor or a fuel-air mixture prepared by the fuel vaporizing device to the individual combustion chambers of the engine can be achieved so that it is possible to maintain extremely low exhaust values as well as a smooth running of the engine.

BRIEF DESCRIPTION OF THE DRAWINGS

Exemplary embodiments of the invention are shown in simplified form in the drawings and are explained in detail in the description below.

DESCRIPTION OF THE EXEMPLARY EMBODIMENTS

Figure 1:
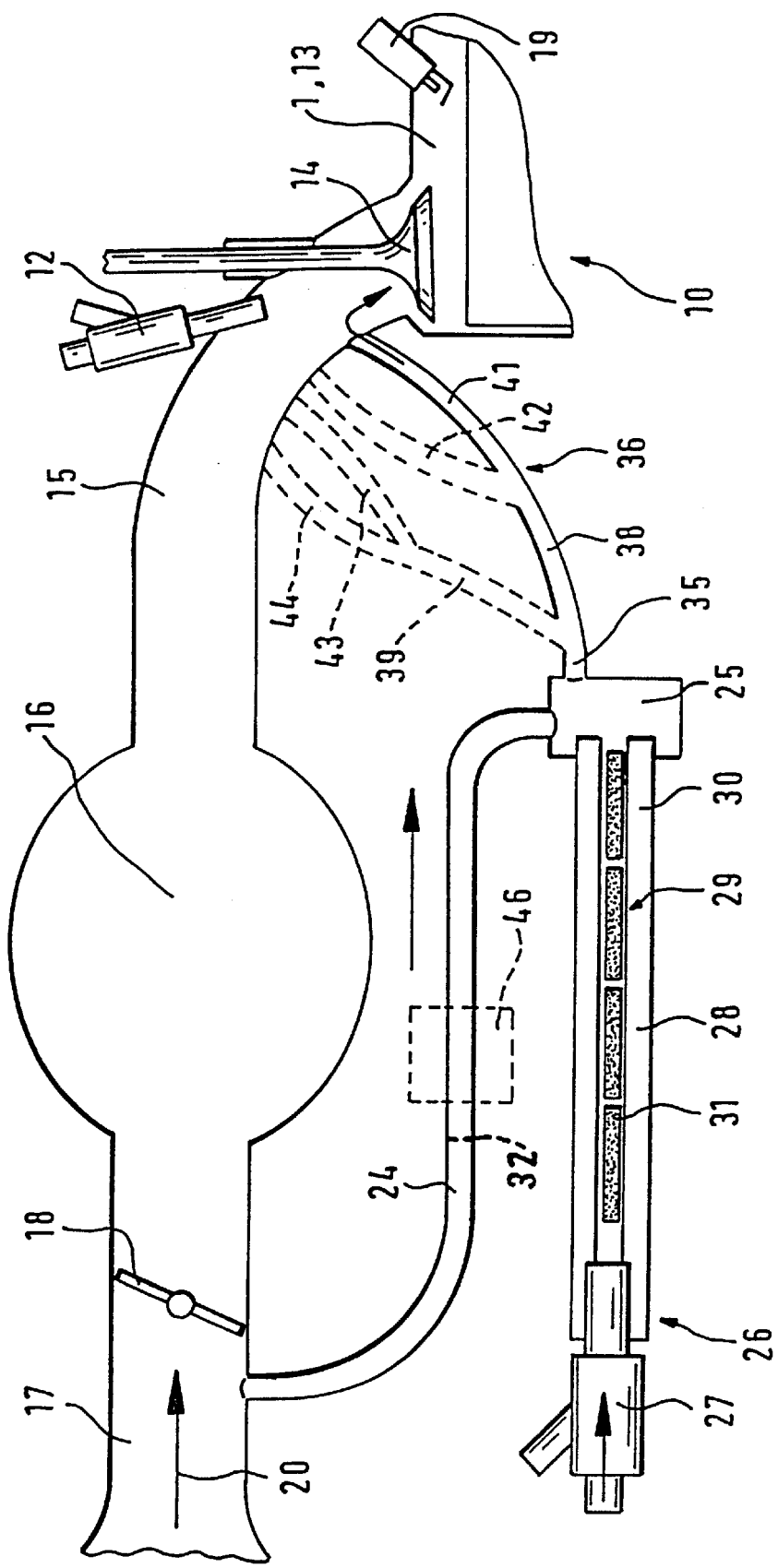
FIG. 1 is a sectional representation of a partial view of an internal combustion engine according to the invention.

In a sectional representation, FIG. 1 shows a partial view of an internal combustion engine 10, which has four cylinders 1, 2, 3, 4 or four combustion chambers 13, wherein in FIG. 1, only a single cylinder 1 with one combustion chamber 13 is depicted. Each combustion chamber 13 has at least one inlet valve 14 and one spark plug 19. Upstream of the inlet valve 14, at least one fuel injection valve 12 is provided on an individual intake tube 15 of the engine 10, which can deliver fuel into the individual intake tube 15 in the direction of the inlet valve 14. The four individual intake tubes 15 lead, for example, from an intake manifold 16 that is part of a continuing intake tube 17 of the engine 10. A throttle mechanism 18, which is for controlling the air quantity aspirated by the engine 10 and is accommodated in the intake tube 17, is embodied, for example, in the form of a throttle valve and is accommodated so that it can rotate in the intake tube 17. The air aspirated from the surroundings by the engine 10 flows via an air filter, not shown in detail, in the direction of an arrow 20 drawn in FIG. 1 and into the intake tube 17, where it flows further into the intake manifold 16 when the throttle valve 18 is open and is then distributed by this intake manifold via the individual intake tubes 15 to the individual combustion chambers 13 of the engine 10.

Upstream of the throttle valve 18, an idling air line 24 branches off from the intake tube 17 and leads to a mixing chamber 25 of a fuel vaporizing device 26. A throttle 32 can be disposed in the idling line 24, for example in the form of an orifice, which limits the air quantity flowing in the idling line 24 by means of throttling. The fuel vaporizing device 26 has, for example, a central injection valve 27 that is equipped with a heating attachment 28. The heating attachment 28 comprises a vaporizer structure 29 that can, for example, be electrically heated in a known manner, for liquid fuel and for this purpose, has resistance heating elements 31, which can, for example, have a positive temperature coefficient (PTC) or a negative temperature coefficient (NTC). For example, an electronic control device, not shown in detail, can be provided to control the resistance heating elements 31. The resistance heating elements 31 are accommodated in a vaporizer housing 30 and are embodied, for example, as plate-shaped and if need be, have a porous surface. A central line 35 leads from the mixing chamber 25 of the fuel vaporizing device 26 and transitions into a branched line system 36, which produces a flow connection of the individual combustion chambers 13 of the engine 10 to the mixing chamber 25. The line system 36 is embodied as branching according to the invention into the individual intake tubes 15 of the engine 10 in such a way that only respective combustion chambers 13 or cylinders 1, 2, 3, 4 which are not disposed in direct ignition sequence in relation to one another, are connected in pairs to each other and jointly via the central line 35 to the fuel vaporizing device 26 or the mixing chamber 25.

Figure 2:
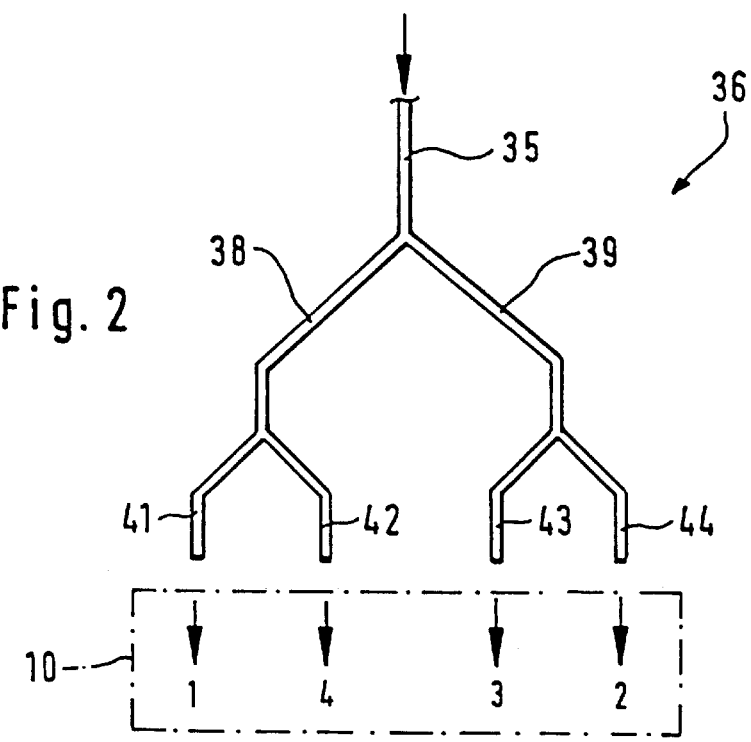
FIG. 2 shows a first exemplary embodiment according to the invention of a line system for the engine.

The line system 36 according to the invention for a four-cylinder internal combustion engine with externally supplied ignition is shown in more detail in FIGS. 1 and 2. The engine 10, indicated in FIG. 2 by means of dashed lines, has four cylinders 1, 2, 3, and 4, which, diverging from the depiction in FIG. 2, are in reality disposed one after the other in the sequence 1, 2, 3, and 4 and are operated with an ignition sequence, for example, of 1-3-4-2. The central line 35 leading away from the fuel vaporizing device 26 branches into a first cylinder pair line 38 and a second cylinder pair line 39. The first cylinder pair line 38 branches further into a first cylinder line 41 for the first cylinder 1 and a second cylinder line 42 for the fourth cylinder 4. In the same way, the second cylinder pair line 39 branches into a third cylinder line 43 for the third cylinder 3 and a fourth cylinder line 44 for the second cylinder 2. The resulting branching points of the lines 35, 38, 39, and 38, 41, 42, and 39, 43, 44 have a Y-shape with legs, which preferably enclose an angle that is as acute as possible between the branching lines 41 and 42; 43 and 44 in order, by means of an increased flow resistance, to thus minimize a reciprocal influence of the cylinders that are connected to each other in pairs. For the sake of completeness, it should be mentioned that it is also possible to embody the branching points in a T-shape. Since the first cylinder line 41 is connected to the first cylinder 1, the second cylinder line 42 is connected to the fourth cylinder 4, the third cylinder line 43 is connected to the third cylinder 3, and the fourth cylinder line 44 is connected to the second cylinder 2, the provided ignition sequence of cylinders 1-3-4-2, i.e. ignition by spark plugs 19 first of cylinder 1, then cylinder 3, then cylinder 4, and finally cylinder 2 results in the fact that only respective combustion chambers or cylinders that are not operated in direct ignition sequence are connected to each other in pairs and are connected to the fuel vaporizing device 26 via the cylinder pair lines 38, 39 and the central line 35.

The lines 35, 38, 39, 41 to 44 of the line system 36 are preferably embodied in the form of tubes or hoses that are comprised of an elastic material with a low heat conductivity, e.g. plastic. The connection of the cylinder lines 41 to 44 or the introduction of fuel vapor into the individual intake tubes 15 occurs in relative proximity to the inlet valves 14 of the engine 10, as shown in FIG. 1.

The operation of the fuel vaporizing device 26 is preferably limited to the lower load range, in particular to the idling range of the engine 10. However it is also possible to provide the operation of the fuel vaporizing device 26 also in the partial load range that adjoins the idling range and even up to just before the full load of the engine is achieved. Particularly in the range of the upper partial load, a fuel-air mixture can be produced in the lines 35, 38, 39, 41, 42, 43, 44 which is too rich, i.e. has too high a percentage of fuel to achieve ignition by means of spark plugs 19. An increase of the air percentage is not possible since the air quantity supplied to the mixing chamber 25 is kept constant, for example, by a fixed throttle 32 provided in the idling line 24. However, this has no influence on the combustion in the combustion chambers 13 of the cylinders 1 to 4, since after the delivery of the excessively rich fuel-air mixture via the lines 41 to 44, an ignitable fuel-air mixture is set once again by mixing with the air aspirated into the individual intake tubes 15. Upon introduction of the fuel-air mixture by means of the fuel vaporizing device 26, the fuel injection valves 12 remain inactive, i.e. without injecting fuel. Only the central injection valve 27 of the fuel vaporizing device 26 delivers fuel in a fluid form, which then arrives in the electrically heated vaporizer structure 29 in order to be heated in this and to at least partially vaporize. Due to the volume change of the liquid fuel that occurs with the heating, at the transition into the vaporous phase, this is delivered into the mixing chamber 25. At the same time, air is brought into the mixing chamber 25 via the idling air line 24 in order to obtain an ignitable fuel-air mixture with $\lambda=1$ in the mixing chamber 25 in the idling range, which is then delivered into the line system 36 via the central line 35. The fuel percentage of the fuel-air mixture can be controlled by means of the injection quantity of the central injection valve 27 of the fuel vaporizing device 26. The air quantity supplied to the mixing chamber 25 should essentially correspond to the idling air quantity normally required in the idling operation of the engine. It is, however, also possible to provide an idle regulating device 46, shown in FIG. 1 with dashed lines, on the idling air line 24 in order to be able to control the air quantity supplied to the mixing chamber 25. After the end of the warm running phase or when there is a need for more fuel, e.g. with sharp acceleration, when ascending a mountain, or the like, in addition to or in lieu of mixture preparation by means of the fuel vaporizing device 26, a switch can be made over to conventional single injection with the fuel injection valves 12.

As explained above, in the line system 36 shown in FIG. 2, only cylinders that are not operated with direct cylinder sequence or intake sequence are connected to each other and to the fuel vaporizing device 26 so that for the cylinders 1, 2, 3, 4 that aspirate one after the other in the sequence 1-3-4-2, there are vapor line paths to the mixing chamber 25 with different lengths. Through a suitable length choice of the lines 38, 39, and 41 to 44, a reciprocal influence due to intake tube oscillations when the cylinders aspirate can be almost completely prevented so that a uniform distribution of the fuel-air mixture formed in the mixing chamber 25 to the individual cylinders 1, 2, 3, and 4 of the engine 10 or combustion chambers 13 is produced.

Figure 3:
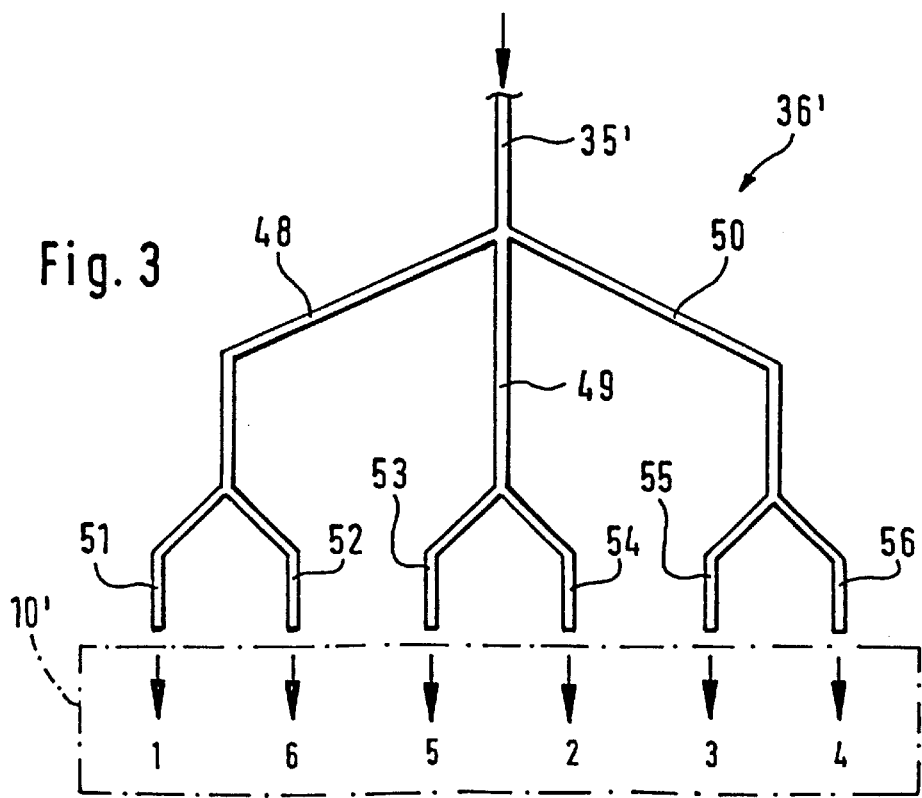
FIG. 3 shows a second exemplary embodiment according to the invention of a line system for the engine.

FIG. 3 shows a second exemplary embodiment of the engine according to the invention in which all of the same parts or parts which function equivalently are given the same reference numerals as in FIGS. 1 and 2. FIG. 3 uses dashed lines to indicate an engine 10' that has six cylinders 1, 2, 3, 4, 5, and 6, which, diverging from the depiction in FIG. 3, are in reality disposed one after the other in the sequence 1, 2, 3, 4, 5, and 6 and are operated with an ignition sequence, for example, of 1-5-3-6-2-4. The central line 35' leading away from the fuel vaporizing device 26 branches into a first cylinder pair line 48, a second cylinder pair line 49, and a third cylinder pair line 50. The first cylinder pair line 48 branches further into a first cylinder line 51 for the first cylinder 1 and a second cylinder line 52 for the sixth cylinder 6. The second cylinder pair line 49 branches further into a third cylinder line 53 for the fifth cylinder 5 and a fourth cylinder line 54 for the second cylinder 2. The third cylinder pair line 50 branches further into a fifth cylinder line 55 for the third cylinder 3 and a sixth cylinder line 56 for the fourth cylinder 4. The resulting branching points of the lines 48, 51, 52, and 49, 53, 54, and 50, 55, 56 of the line system 36' have a Y-shape with legs, which preferably enclose an angle that is as acute as possible between the branching lines 51, 52; 53, 54; 55, 56. Since the first cylinder line 51 is connected to the first cylinder 1, the second cylinder line 52 is connected to the sixth cylinder 6, the third cylinder line 53 is connected to the fifth cylinder 5, the fourth cylinder line 54 is connected to the second cylinder 2, the fifth cylinder line 55 is connected to the third cylinder 3, and the sixth cylinder line 54 is connected to the fourth cylinder 4, the provided ignition sequence 1-5-3-6-2-4 of cylinders 1 to 6 results in the fact that only respective combustion chambers or cylinders that are not operated in direct ignition sequence are connected to each other in pairs and are connected to the fuel vaporizing device 26 via common lines 48, 49, 50 and via the central line 35'. As a result, for the cylinders 1 to 6 that aspirate one after the other in the sequence 1-5-3-6-2-4, there are in turn vapor line paths of different lengths to the mixing chamber 25 so that a uniform distribution of the fuel-air mixture to the individual combustion chambers 13 is possible without reciprocal influence of the cylinders 1 to 6.

The foregoing relates to preferred exemplary embodiments of the invention, it being understood that other variants and embodiments thereof are possible within the spirit and scope of the invention, the latter being defined by the appended claims.

We claim:

1. A multicylinder internal combustion engine having a plurality of cylinders each having a combustion chamber with externally supplied ignition, which comprises an intake device from which individual intake tubes branch to each of the combustion chambers of the engine, at least one inlet valve per combustion chamber with a fuel injection valve provided upstream of the inlet valve, said fuel injection valve delivers fuel into the individual intake tube, and a fuel vaporizing device that prepares a fuel-air mixture in particular operating ranges of the engine, the fuel vaporizing device (26) is connected via lines (38, 39, and 41 to 44; 48, 49, 50, and 51 to 56) to the individual intake tubes (15) of the engine (10), and the lines (38, 39, and 41 to 44; 48, 49, 50, and 51 to 56) branch downstream of the fuel vaporizing device (26) in such a way that only respective combustion chambers (13) that are not operated one after the other in direct ignition sequence are connected to each other in pairs via cylinder lines (41 to 44 or 51 to 56) and to the fuel vaporizing device (26).

2. An engine according to claim 1, in which only combustion chambers (13) with the greatest chronological distance from each other in the ignition sequence are connected to each other in pairs via cylinder lines.

3. An engine according to claim 1, in which in an engine (10) with four cylinders (1, 2, 3, 4), two cylinder pair lines (38, 39) branch off from a central line (35) connected with the fuel vaporizing device (26), wherein each cylinder pair line (38; 39) branches further into two cylinder lines (41, 42; 43, 44), which feed into individual intake tubes (15) of cylinders (1, 4; 2, 3) that are not operated in a direct ignition sequence (1-3-4-2).

4. An engine according to claim 1, in which in an engine (10 ) with six cylinders (1, 2, 3, 4, 5, 6), three cylinder pair lines (48, 49, 50) branch off from a central line (35) connected with the fuel vaporizing device (26), wherein each cylinder pair line (48; 49; 50) branches further into two cylinder lines (51, 52; 53, 54; 55, 56), which feed into individual intake tubes (15) of cylinders (1, 6; 5, 2; 3, 4) that are not operated in a direct ignition sequence (1-5-3-6-2-4).

5. An engine according to claim 3, in which the cylinder lines (41 to 44; 51 to 56) feed into the individual intake tubes in the vicinity of the inlet valves (14).

6. An engine according to claim 5, in which the branching points of the three lines (38, 41, 42; 39, 43, 44; 48, 51, 52; 49, 53, 54; 50, 55, 56) have a Y-shape.

7. An engine according to claim 5, in which the branching points of the three lines (38, 41, 42; 39, 43, 44; 48, 51, 52; 49, 53, 54; 50, 55, 56) enclose an angle that is as acute as possible between the lines (41, 42; 43, 44; 51, 52; 53, 54; 55, 56).

8. An engine according to claim 6, in which the branching points of the three lines (38, 41, 42; 39, 43, 44; 48, 51, 52; 49, 53, 54; 50, 55, 56) enclose an angle that is as acute as possible between the lines (41, 42; 43, 44; 51, 52; 53, 54; 55, 56).

9. An engine according to claim 4, in which the cylinder lines (41 to 44; 51 to 56) feed into the individual intake tubes in the vicinity of the inlet valves (14).

\* \* \* \* \*